US012794292B2

(12) United States Patent
Mertens et al.

(10) Patent No.: US 12,794,292 B2
(45) Date of Patent: Nov. 10, 2026

(54) PERMANENT MAGNET ARRANGEMENT FOR AN AXIAL FLUX MACHINE OF A DOOR DRIVE AND AXIAL FLUX MACHINE

(71) Applicant: dormakaba Deutschland GmbH, Ennepetal (DE)

(72) Inventors: Tim Mertens, Wuppertal (DE); Jan Eric vom Brocke, Ennepetal (DE); Sven Busch, Dortmund (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 206 days.

(21) Appl. No.: 18/752,246

(22) Filed: Jun. 24, 2024

(65) Prior Publication Data

US 2025/0007342 A1 Jan. 2, 2025

(30) Foreign Application Priority Data

Jun. 27, 2023 (EP) .................................... 23181711

(51) Int. Cl.
*H02K 1/2795* (2022.01)

(52) U.S. Cl.
CPC ....... *H02K 1/2795* (2022.01); *H02K 2201/06* (2013.01)

(58) Field of Classification Search
CPC ......................... H02K 1/2795; H02K 2201/06
See application file for complete search history.

(56) References Cited

U.S. PATENT DOCUMENTS

| | | | | |
|---|---|---|---|---|
| 2017/0250637 | A1* | 8/2017 | King | H02P 8/22 |
| 2018/0198335 | A1 | 7/2018 | Inoue et al. | |
| 2021/0288569 | A1 | 9/2021 | Yao et al. | |
| 2021/0317693 | A1* | 10/2021 | Hirtenlehner | G01D 5/14 |
| 2022/0181920 | A1 | 6/2022 | Zhang et al. | |

FOREIGN PATENT DOCUMENTS

| | | | | |
|---|---|---|---|---|
| DE | 102022004792 | A1 * | 2/2023 | H02K 1/2795 |
| EP | 3974610 | A1 | 3/2022 | |
| JP | H10164779 | A | 6/1998 | |

* cited by examiner

*Primary Examiner* — Viet P Nguyen
(74) *Attorney, Agent, or Firm* — CANTOR COLBURN LLP

(57) ABSTRACT

A permanent magnet arrangement for use as a rotor or stator of an axial flux machine, has permanent magnets arranged in a ring-shaped manner around a machine axis and each magnetised in an axial direction running parallel to the central axis. Permanent magnets arranged adjacent to each other each have an oppositely aligned polarisation. Each permanent magnet extends away from an inner surface of the permanent magnet facing the machine axis to an outer surface of the permanent magnet. Each permanent magnet has a first side surface and an opposite second side surface. The two side surfaces connect the inner and the outer surfaces with each other. The first side surface of each permanent magnet is aligned in the direction of the second side surface of a respectively immediately adjacent permanent magnet. Each first side surface has a stepped course from the inner surface to the outer surface.

9 Claims, 2 Drawing Sheets

PERMANENT MAGNET ARRANGEMENT FOR AN AXIAL FLUX MACHINE OF A DOOR DRIVE AND AXIAL FLUX MACHINE

CROSS-REFERENCE TO RELATED APPLICATIONS

This application claims the benefit of European patent application 23181711.5 filed, on 27 Jun. 2023, the disclosure of which is incorporated herein by reference in its entirety.

TECHNICAL FIELD

The disclosure relates to a permanent magnet arrangement for use as a rotor or stator of an axial flux machine, in particular an axial flux machine of a door drive, with the permanent magnet arrangement having a plurality of permanent magnets arranged in a ring-shaped manner around a machine axis and each magnetised in an axial direction running parallel to the central axis, with permanent magnets arranged adjacent to one another each having an oppositely aligned polarisation, with each permanent magnet extending away from an inner surface of the permanent magnet facing the machine axis to an outer surface of the permanent magnet, with each permanent magnet having a first side surface and a second side surface opposite the first side surface, with the two side surfaces connecting the inner surface and the outer surface to one another, with the first side surface of each permanent magnet being aligned in the direction of the second side surface of a respectively immediately adjacent permanent magnet. The disclosure also relates to an axial flux machine with a coil arrangement and a permanent magnet arrangement.

BACKGROUND

The use of axial flux machines and in particular of brushless axial flux machines for door drives is known from the prior art and is described, for example, in the document EP 3 974 610 A1. In such axial flux machines, the magnetic flux runs through the permanent magnet arrangement and the coil arrangement axially to the axis of rotation of the motor, which forms the machine axis. The permanent magnet arrangement forms part of a stator of the axial flux machine and the coil arrangement forms part of a rotor of the axial flux machine or the permanent magnet arrangement forms part of the rotor of the axial flux machine and the coil arrangement forms part of the stator of the axial flux machine. The permanent magnets of the permanent magnet arrangement and coils of the coil arrangement are thereby usually arranged in a ring-shaped manner around the machine axis. The permanent magnets are aligned such that one of the poles of each permanent magnet is closer to the coil arrangement than the other pole, such that within the respective permanent magnet, magnetic field lines running between the north pole and the south pole run parallel to the machine axis. The permanent magnets usually have an approximately trapezoidal base surface, with dimensions of the base surface being a multiple of the height of the respective permanent magnet. Straight lines through side edges of the base surface thereby usually run through a point on the axis of rotation or the machine axis, such that an inner edge of the base surface is shorter than an outer edge of the base surface. The permanent magnets therefore have the shape of an approximately trapezoidal prism. Often the inner edge and the outer edge are also designed in a circular segment shape, such that the base surface forms a ring segment.

SUMMARY

The permanent magnets of the permanent magnet arrangement according to the disclosure each have an inner surface, an outer surface and opposite side surfaces. These can be clearly distinguished from one another.

It is known that during operation of these axial flux machines, so-called cogging forces or cogging torques occur, which lead to increased noise and vibration during operation and reduce the overall efficiency of the machine. The cogging forces are magnetic interference forces and are caused by interactions between the permanent magnets and coil cores or stator teeth, which are made of iron or another material with good magnetic conductivity. In order to reduce these cogging forces, various measures are known from the prior art.

One of these measures is the so-called "bevelling of the magnet edges" of the permanent magnets. In this measure, the permanent magnets are adjusted starting from the approximately trapezoidal base surface such that the straight lines through the side edges no longer run through the axis of rotation or such that shapes deviating from the trapezoidal shape are selected, for example with bent side edges. One possibility known from the prior art for bevelling the magnet edges consists of adjusting the permanent magnets starting from the trapezoidal base surface such that the side edges are tilted by a so-called helix angle against the straight line running through the axis of rotation. The side edges of the permanent magnets thereby have the same displacement angle for each connection point on the respective side edge or at least for each connection point on sections of the side edges in the case of a bent course of the side edge. This is also called the helix angle.

The disclosure further develops the configurations of the magnet edges known from the prior art such that the cogging torques are further reduced.

This is achieved according to the disclosure in that each first side surface has a stepped course from the inner surface to the outer surface. Investigations with conventional permanent magnets with an approximately trapezoidal base surface with circular segment-shaped inner and outer edges have shown that the contribution of individual sections of the permanent magnets to the cogging torques generated by these permanent magnets depends on the distance of the respective section from the machine axis. In addition, it has been found that this contribution does not depend linearly on the distance. The configuration, according to the disclosure, of at least one of the two side surfaces utilises this knowledge to further reduce the cogging torques. For this purpose, instead of being configured with a constant displacement or helix angle, the base surface of the permanent magnet or at least one of the side surfaces is configured such that this side surface has a plurality of different helix angles.

The cogging torques can advantageously be further reduced by increasing a ratio of a step width to a step height of steps of the stepped course of the first side surface from the inner surface to the outer surface. It has been shown that the cogging torques can be reduced particularly well if the helix angles are larger the greater the distance of the respective section of the permanent magnet from the machine axis and with the respective helix angle increasing disproportionately depending on this distance. This is achieved by increasing the ratio of step width to step height.

The step width is thereby the length of a step on the side edge or side surface of the permanent magnet that protrudes approximately in the circumferential direction and the step height is the length of the step on the side edge or side surface of the permanent magnet that points approximately in the radial direction.

Advantageously, it is provided according to the disclosure that each second side surface has a stepped course of steps of the stepped course of the first side surface from the inner surface to the outer surface. In this way, the second side surface is inclined or tilted or bevelled and curved or stepped in the same direction as the first side surface.

In a particularly advantageous configuration of the permanent magnet arrangement according to the disclosure, it is provided that a ratio of a step width to a step height increases from the inner surface to the outer surface. In this way, the helix angle of the second side surface changes disproportionately in relation to the distance of the respective section from the machine axis, as with the first side surface.

Advantageously, it is provided according to the disclosure that all section planes of each permanent magnet that are perpendicular to the machine axis are congruent. As a result, all first connecting lines of equal length have the same first displacement angle and all second connecting lines of equal length have the same second displacement angle. This results in both side surfaces having a curved or stepped course exclusively in one circumferential direction.

In a particularly advantageous configuration of the permanent magnet arrangement according to the disclosure, it is provided that the inner surface of each permanent magnet runs in sections along an inner ring circumference of the permanent magnet arrangement and the outer surface of each permanent magnet runs in sections along an outer ring circumference of the permanent magnet arrangement. The ring-shaped configuration of the permanent magnet arrangement results in a magnetic field that is particularly suitable for the axial flux machine.

In a particularly advantageous configuration of the permanent magnet arrangement according to the disclosure, it is provided that the permanent magnets are configured and the inner surfaces and the outer surfaces of each permanent magnet are aligned with each other such that, in at least one section plane perpendicular to the machine axis, a beam running radially from the machine axis through an inner distance centre point of the inner surface of each permanent magnet intersects the outer surface or the outer ring circumference of the respective permanent magnet at a distance from an outer distance centre point, with the inner distance centre point and the outer distance centre point being determined by the average path length between end points of the respective inner surface or the respective outer surface.

Advantageously, it is provided according to the disclosure that the outer surface is displaced relative to the inner surface in the circumferential direction. This displacement refers to the approximately trapezoidal basic shape of the permanent magnets known from the prior art.

Advantageously, it is provided according to the disclosure that a length of the outer surface in the circumferential direction is greater than a length of the inner surface. In this way, the available installation space can be fully utilised.

The cogging torques can be further reduced by configuring the permanent magnets and aligning them relative to one another such that, in at least one section plane perpendicular to the machine axis, a beam running radially from the machine axis through an outermost point, in the circumferential direction, of the outer surface of a first permanent magnet runs in sections in the corresponding section plane of a second permanent magnet arranged immediately adjacent to the first permanent magnet. As a result, adjacent permanent magnets overlap in sections when viewed from the machine axis.

According to the disclosure, it is advantageously provided that the outer surface and the inner surface of the permanent magnet do not merge continuously into one another. The inner surface and the outer surface can advantageously be clearly separated from each other and from the side surfaces. Advantageously, the side surfaces do not continuously merge into the inner surface and the outer surface.

The disclosure also relates to an axial flux machine with a coil arrangement and a permanent magnet arrangement according to one of the preceding claims, with the coil arrangement having a plurality of electrical machine coils arranged adjacent to one another in a ring-shaped manner around the machine axis, with the coil arrangement being arranged axially displaced, adjacent to the permanent magnet arrangement. Advantageously, the axial flux machine is a brushless axial flux machine. Such axial flux machines are particularly suitable for use with door or window drives.

Advantageously, it is provided according to the disclosure that the inner ring circumference and the outer ring circumference of the permanent magnet arrangement correspond substantially to corresponding ring circumferences of the coil arrangement. In this way, a particularly compact design of the axial flux machine can be achieved.

According to the disclosure, it is advantageously provided that the axial flux machine can be used in a swing door leaf, sliding door or revolving door drive.

BRIEF DESCRIPTION OF THE DRAWINGS

Further advantageous configurations of the permanent magnet arrangement according to the disclosure are explained in more detail with reference to exemplary embodiments represented in the drawing.

DETAILED DESCRIPTION OF THE DRAWINGS

Figure 1:
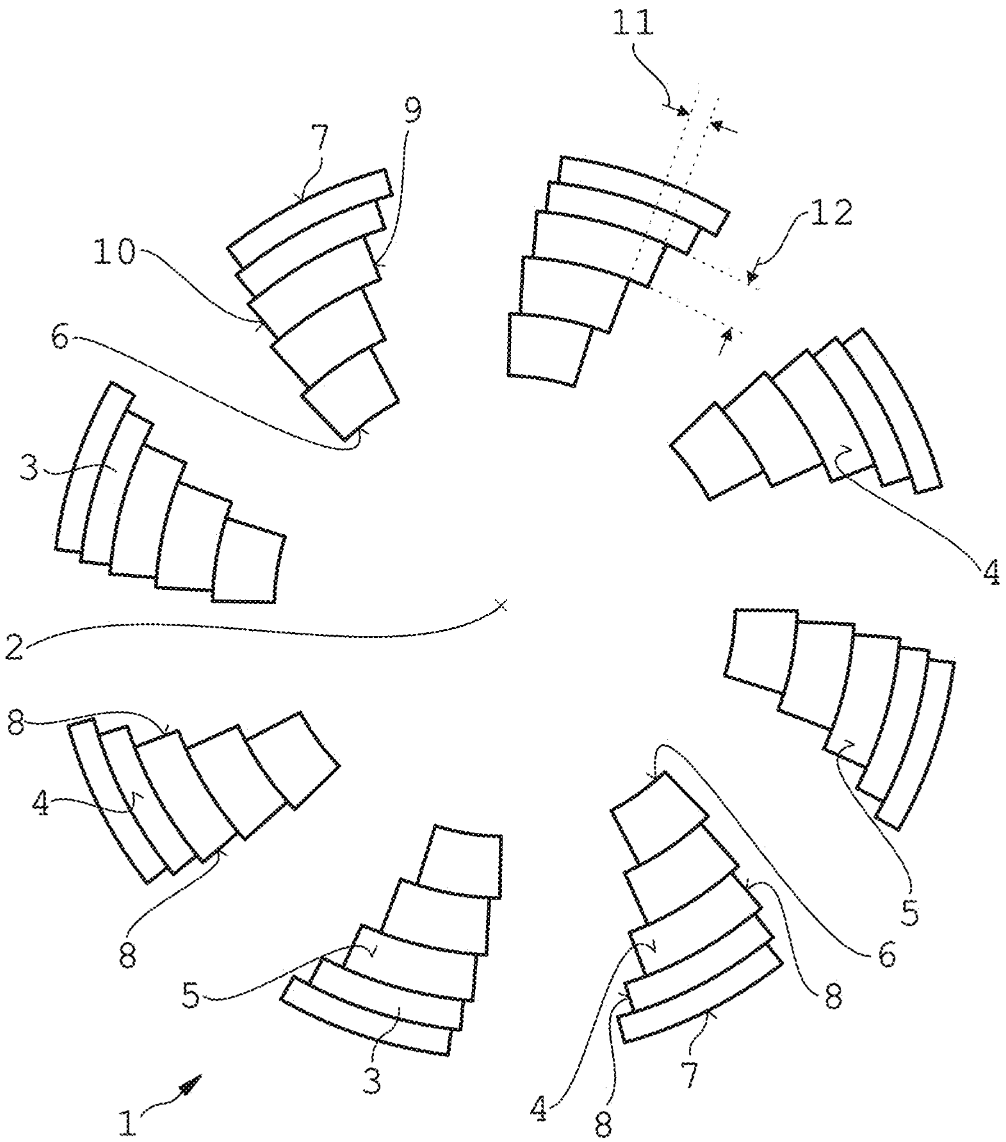
FIG. 1 is a schematic representation of a permanent magnet arrangement with permanent magnets that have a stepped course of the side surfaces and FIG. 2 is a schematic representation of an axial flux machine.

FIG. 1 schematically represents a permanent magnet arrangement 1 for an axial flux machine of a door drive. The permanent magnet arrangement 1 has a plurality of permanent magnets 3 arranged adjacent to one another in a ring-shaped manner around a machine axis 2. A magnetic north pole 4 and a magnetic south pole 5 of each permanent magnet 3 are arranged such that within the respective permanent magnet 3, magnetic field lines running between the north pole 4 and the south pole 5 run parallel to the machine axis 2, with magnetic field directions of adjacent permanent magnets 3 running in opposite directions.

Each permanent magnet 3 extends away from an inner surface 6 facing the machine axis 2 to an outer surface 7. The inner surface 6 and the outer surface 7 are connected by side surfaces 8 of the respective permanent magnet 3, each extending from the north pole 4 to the south pole 5.

First side surfaces 9 and second side surfaces 10 of the permanent magnets 3 each have a stepped course from the inner surface 6 to the outer surface 7. The ratio of a step width 11 to a step height 12 increases from the inner surface 6 to the outer surface 7.

The inner surface 6 and the outer surface 7 of each permanent magnet 3 are curved and run along an inner ring circumference and an outer ring circumference of the permanent magnet arrangement 1. The outer surfaces 7 are thereby displaced relative to the inner surfaces 6 in the circumferential direction. In addition, a length of the outer surfaces 7 in the circumferential direction is greater than a length of the inner surfaces 6.

Figure 2:
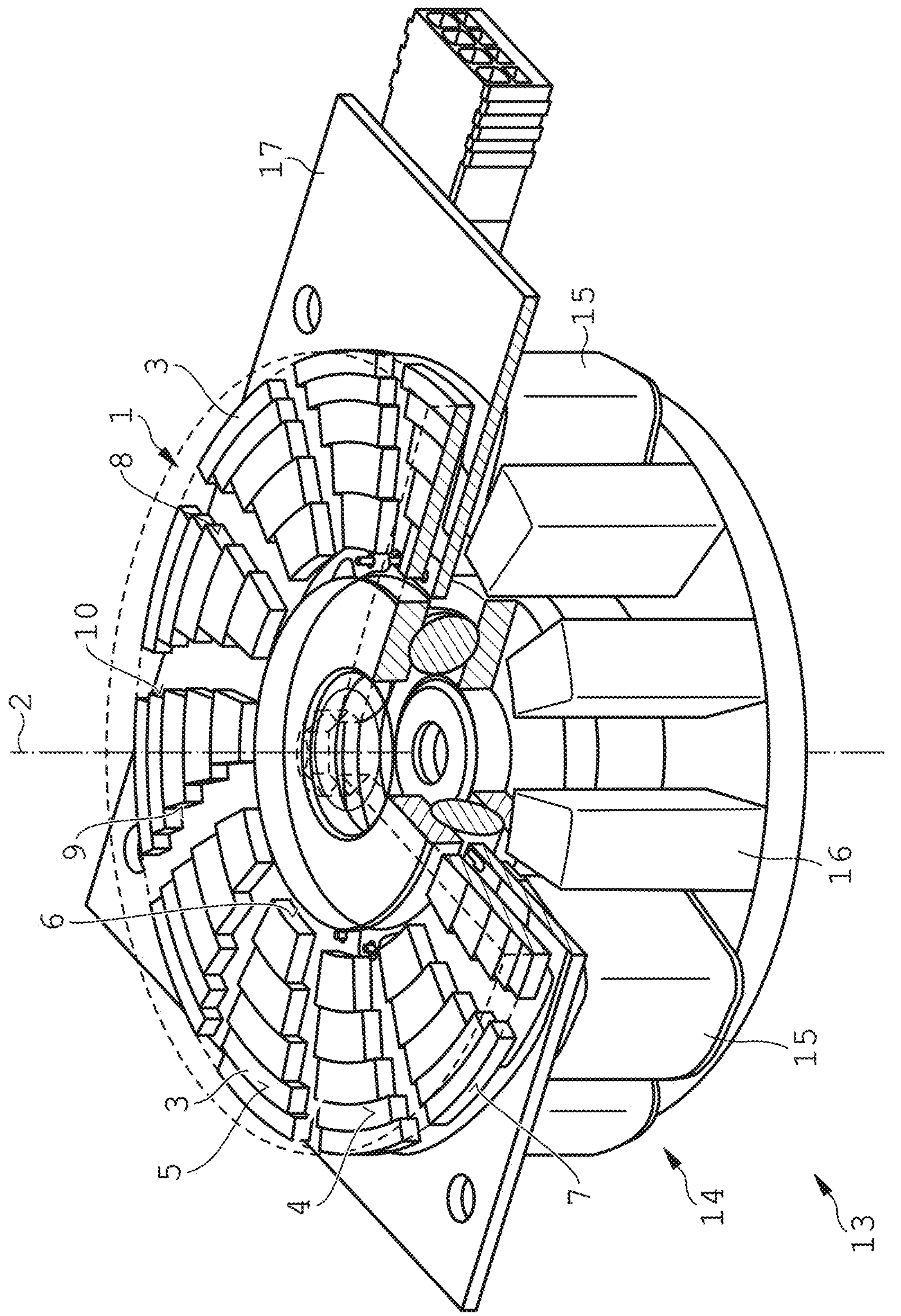

FIG. 2 shows a schematic view of a partially sectioned axial flux machine 13 with a coil arrangement 14 and a permanent magnet arrangement 1. The permanent magnet arrangement 1 thereby corresponds to the configuration represented in FIG. 1. In this representation, it can be seen that all section planes of each permanent magnet 3 that are perpendicular to the machine axis 2 are congruent.

The coil arrangement 14 has a plurality of electrical machine coils 15 which are arranged adjacent to one another in a ring-shaped manner around the machine axis 2 and which are wound around iron cores 16 of the coil arrangement 14. The coil arrangement 14 is arranged axially displaced, adjacent to the permanent magnet arrangement 1. The axial flux machine 13 also has a circuit board 17 for electrically contacting the coils 15.

In the drawing, individual elements of a plurality of similar types are each marked with a reference numeral as an example.

The invention claimed is:

1. A door drive comprising an axial flux machine with a permanent magnet arrangement for use as a rotor or stator of the axial flux machine, wherein the permanent magnet arrangement has a plurality of permanent magnets arranged in a ring-shaped manner around a machine axis and each magnetized in an axial direction running parallel to the central axis, wherein permanent magnets arranged adjacent to one another each have an oppositely aligned polarization, wherein each permanent magnet extends away from an inner surface of the permanent magnet facing the machine axis to an outer surface of the permanent magnet, wherein each permanent magnet has a first side surface and a second side surface opposite the first side surface, wherein the two side surfaces connect the inner surface and the outer surface to one another, wherein the first side surface of each permanent magnet is aligned in the direction of the second side surface of a respectively immediately adjacent permanent magnet, wherein each first side surface has a stepped course from the inner surface to the outer surface, wherein a ratio of a step width to a step height of steps of the stepped course of the first side surface increases from the inner surface to the outer surface, wherein the permanent magnets are configured and the inner surfaces and the outer surfaces of each permanent magnet are aligned with one another such that, in at least one section plane perpendicular to the machine axis, a beam running radially from the machine axis through an inner distance center point of the inner surface of each permanent magnet intersects the outer surface and/or the outer ring circumference of the respective permanent magnet at a distance from an outer distance center point, wherein the inner distance center point and the outer distance center point are determined by the average path length between end points of the respective inner surface and the respective outer surface, or wherein the permanent magnets are configured and aligned relative to one another such that, in at least one section plane perpendicular to the machine axis, a beam running radially from the machine axis through an outermost point, in the circumferential direction, of the outer surface of a first permanent magnet runs in sections in the corresponding section plane of a second permanent magnet arranged immediately adjacent to the first permanent magnet.

2. The door drive according to claim 1, wherein each second side surface has a stepped course from the inner surface to the outer surface.

3. The door drive according to claim 2, wherein a ratio of a step width to a step height of steps of the stepped course of the second side surface increases from the inner surface to the outer surface.

4. The door drive according to claim 1, wherein all cut surfaces of each permanent magnet are congruent through section planes perpendicular to the machine axis.

5. The door drive according to claim 1, wherein the inner surface of each permanent magnet runs in sections along an inner ring circumference of the permanent magnet arrangement and the outer surface of each permanent magnet runs in sections along an outer ring circumference of the permanent magnet arrangement.

6. The door drive according to claim 1, wherein a length of the outer surface in the circumferential direction is greater than a length of the inner surface.

7. The door drive according to claim 1, wherein the axial flux machine comprises a coil arrangement and the permanent magnet arrangement, wherein the coil arrangement has a plurality of electrical machine coils arranged adjacent to one another in a ring-shaped manner around the machine axis, wherein the coil arrangement is arranged axially displaced, adjacent to the permanent magnet arrangement.

8. The door drive according to claim 7, wherein the inner ring circumference and the outer ring circumference of the permanent magnet arrangement correspond substantially to corresponding ring circumferences of the coil arrangement.

9. The door drive according to claim 7, wherein the door drive is used as a swing leaf door, a sliding door, or a revolving door drive.

* * * * *